US007343929B2

(12) United States Patent
Hilton

(10) Patent No.: US 7,343,929 B2
(45) Date of Patent: Mar. 18, 2008

(54) PRESSURE REGULATOR INCORPORATING A PRESSURE BALANCED MOVING SEAT

(75) Inventor: Thomas Joseph Hilton, Kirkland, WA (US)

(73) Assignee: A&H Enterprises, Inc., Kirkland, WA (US)

( * ) Notice: Subject to any disclaimer, the term of this patent is extended or adjusted under 35 U.S.C. 154(b) by 70 days.

(21) Appl. No.: 10/973,772

(22) Filed: Oct. 26, 2004

(65) Prior Publication Data

US 2005/0092370 A1    May 5, 2005

Related U.S. Application Data

(60) Provisional application No. 60/515,930, filed on Oct. 30, 2003.

(51) Int. Cl.
*G05D 16/06*    (2006.01)

(52) U.S. Cl. ........................ 137/509; 137/495

(58) Field of Classification Search ........... 137/494, 137/495, 509, 510, 505.13, 505.25, 508; 251/359

See application file for complete search history.

(56) References Cited

U.S. PATENT DOCUMENTS

| | | | | |
|---|---|---|---|---|
| 2,668,555 | A | * | 2/1954 | Bartolat .................. 137/498 |
| 3,461,909 | A | * | 8/1969 | Vohringer ................ 137/495 |
| 4,275,758 | A | * | 6/1981 | Masuda .................... 137/494 |
| 4,348,159 | A | * | 9/1982 | Acheson .................... 417/220 |
| 4,493,335 | A | | 1/1985 | Watson |
| 4,516,600 | A | * | 5/1985 | Sturman et al. ........... 137/495 |
| 4,635,683 | A | | 1/1987 | Nielsen |
| 4,744,387 | A | | 5/1988 | Otteman |
| 5,501,247 | A | | 3/1996 | Miller |
| 6,026,849 | A | | 2/2000 | Thordarson |
| 6,050,292 | A | * | 4/2000 | Richman et al. ........... 137/510 |
| 6,758,240 | B2 | | 7/2004 | Gregoire |
| 7,051,755 | B2 | * | 5/2006 | Zuck .................... 137/338 |
| 2004/0138025 | A1 | | 7/2004 | Yamaguchi |

* cited by examiner

*Primary Examiner*—Stephen M. Hepperle
(74) *Attorney, Agent, or Firm*—Christensen O'Connor Johnson Kindness PLLC

(57) ABSTRACT

An adjustable pressure control valve includes a body having an inlet port and an outlet port and a handle assembly having a threaded portion and an adjustment knob. A seat assembly disposed within the body includes a seat holder in communication with the outlet port that is received on the threaded portion of the handle assembly, wherein the seat holder is translatable in first and second directions when the handle assembly is rotated in first and second directions. The seat assembly also includes a valve seat fluidly affixed to the seat holder, wherein fluid can pass through the valve seat and the seat holder. The valve includes a pin biased by a pin spring that is engageable with the valve seat, and a main spring engageable with the pin to urge the pin against the valve seat to accommodate the pressure and volume of the fluid in the valve.

20 Claims, 8 Drawing Sheets

PRESSURE REGULATOR INCORPORATING A PRESSURE BALANCED MOVING SEAT

This application claims the benefit of the filing date of my earlier filed Provisional Application Ser. No. 60/515,930, filed Oct. 30, 2003.

FIELD OF THE INVENTION

The present invention relates to adjustable pressure control valves for controlling the pressure of a fluid from a fluid supply which can accurately regulate a wide range of pressures with a relatively small amount of input torque necessary to change the set pressure.

BACKGROUND OF THE INVENTION

Most pressure regulator designs are based on the concept of an adjustable orifice that is controlled by using an adjustable spring bias to provide a pressure set-point. The principle difference in previous designs of these devices is centered on the method by which the spring bias is applied.

The most common technique for biasing a spring is to apply force directly to the spring by means of an adjusting screw. This technique requires that the device must overcome the force of the spring, as well as the system pressure, and it is the least efficient. A typical control device consists of a pin and seat which, working with a bias spring, provides a controlled orifice.

For low pressure, the down side of using this technique is relatively small, and the complexity of the valve is minimal. For high pressure, the force of adjustment becomes more problematical and thus, other techniques to artificially bias the spring are used. In some cases, the seat is adjusted independently relative to the control pin, which artificially biases the springs. In other cases, the pin is biased relative to the spring by changing its relationship to the seat.

There are a number of pressure regulators that employ a moving seat conceived to overcome some of the shortcomings of the previous technology. The major improvement introduced here is to change the method of biasing the piston spring set. In previous patented technologies, either the springs were adjusted from an external source, or a moving seat was employed to achieve the same result In both cases, it was necessary to overcome the system pressure in order to make an adjustment, which resulted in high torque loads needing to be applied for any adjusting screws

DESCRIPTION OF PRIOR ART

The previous technology which most closely resembles this PBMS design employs a moving seat to change the bias of the springs, thus changing the pressure control set-point. This technology relies on minimizing the area of the moving seat that is exposed to the system pressure. There is, however, still an imbalance between the atmospheric pressure and the system pressure, which changes the volume of the valve during adjustment. The force necessary to displace the fluid at high pressure can still be very significant.

PRESSURE BALANCE MOVING SEAT (PBMS) TECHNOLOGY

The potentially patentable aspect of the PBMS technology is that the moving seat does not change the internal volume of the device. Thus, in adjusting the device, no static pressure imbalance has to be overcome, as is the case in previous technology. This concept provides a means to adjust the pressure regulation set-point with minimal force. For high pressures, this is very significant, especially if remote-control acuation is desired.

SUMMARY OF INVENTION

Figure 1:
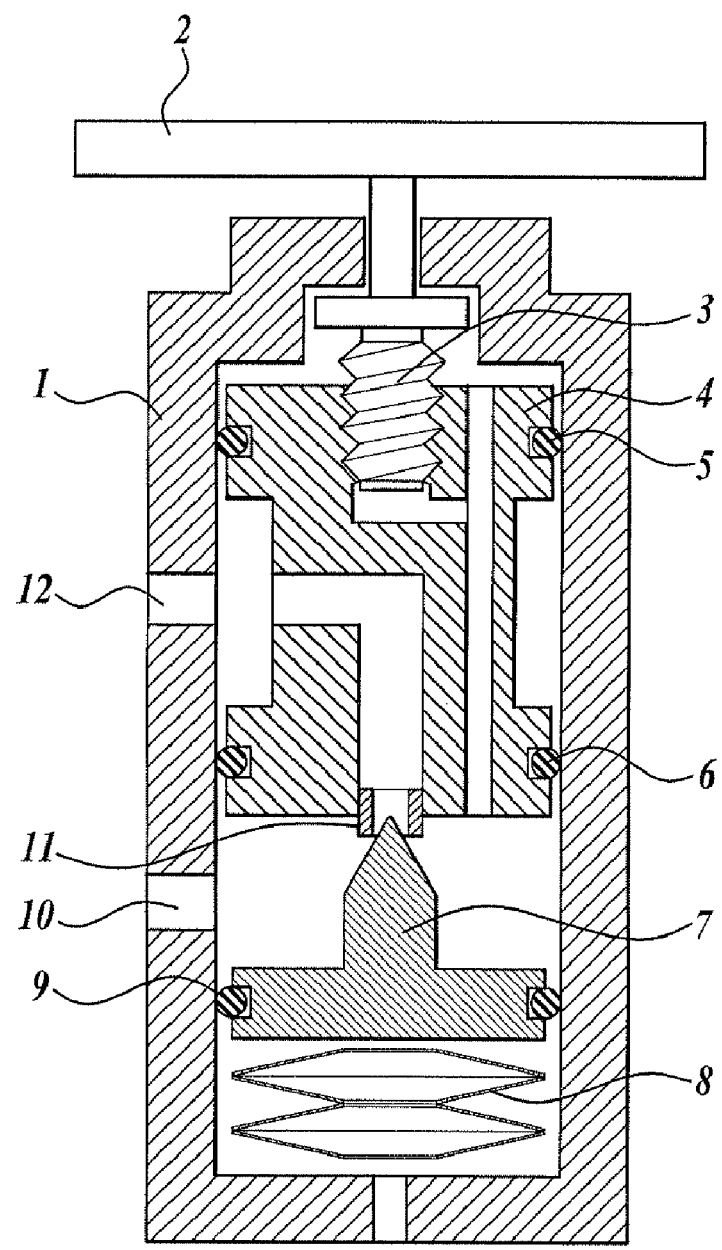
FIG. 1 is a cross-sectional schematic side view of a pressure regulator constructed in accordance with one embodiment of the present disclosure.

The present invention provides adjustable pressure control valves for controlling the pressure of a fluid from a fluid supply. Valves of the present invention can accurately regulate a wide range of pressures and requires a relatively small amount of torque to adjust the pressure of the valve during operation.

The valve consists of five major components.

First is the body which houses all of the functioning components.

Second is the adjustment handle assembly which passes through the body and has a thread engagement on one end and an adjustment knob on the other. This assembly can rotate within the housing, but does not translate.

Third is the seat assembly which consists of a valve seat that is affixed to one end of the housing and a thread engagement on the opposite end that engages the threaded end of the handle assembly. The seat assembly also includes seals which isolate the outlet port from any flow path other than through the seat. Additionally, there is a flow path through the seat housing which allows fluid to pass through the housing in either direction when the housing is translated via the thread engagement with the handle assembly.

Fourth is the pin assembly which consists of a pin that is designed to engage the seat at varying distances, depending upon the pressure and volume that is being regulated through the valve. The pin assembly consists of a pin and a housing that permits the pin to translate within the housing. The pin is biased via a spring. The purpose of this translation is to compensate for the force of the main springs when fluid pressure is removed from the valve.

Fifth is the valve spring assembly which consists of the main spring stack and housing. This spring stack provides the necessary force to provide the required regulation.

The functionality of the valve is as follows: When fluid is introduced into the inlet port, it passes through the seat contained within the seat housing and exits through the outlet port. A restriction can be induced at the seat by translating the seat in the direction of the pin assembly. As the pin moves into the seat, the volume of fluid that can pass through the seat is decreased.

It should be noted that the pin contained within the pin assembly is biased, as noted above, by a spring, but also by the pressure of the fluid that is introduced into the valve. Therefore, the force on the pin is equal to the valve pressure force plus the spring pressure force, which then prevents the pin from translating within its housing.

The pressure of the fluid being restricted then causes the pin assembly to translate against the bias of the main spring. The combination of the force of the main spring, the restriction, and the fluid pressure results in a pressure balance that is maintained by the proximity of the seat and the pin to each other. The pin translates relative to the seat to maintain a set pressure.

The control valve of the present invention is capable of accurately regulating fluid pressures at any set pressure. This particular embodiment is especially useful for regulating very high pressures, because there is no change in volume of fluid within the valve when an adjustment is made. This adjustment feature is unique to this present invention.

The torque requirement needed to operate the valve is largely a function of a change in seal pressure as the pressure is increased. Therefore, the torque required to turn the adjustment handle is fairly insignificant throughout the whole pressure range. This attribute of the present invention makes the valve easily adaptable to automation using low energy actuators. The valve size can be scaled up or down with no limit outside of the practical applications.

While this design is primarily for liquids, the same technology could be applied to a gas regulator, as the principles hold for either type of fluid.

DETAILED DESCRIPTION OF THE INVENTION

The embodiment of the PBMS for a pressure regulator application is as follows:

Referring to FIG. 1, the valve constructed in accordance with one embodiment of the present disclosure includes of a body (1) that houses all of the functioning components, and an adjustment handle (2) that rotates within the body, but does not translate. This adjustment handle has a threaded portion (3) that connects it to the moving seat assembly (4). The seat assembly (4) includes a seat (11) contained within the seat assembly (4) and is sealed on both ends by seals (5) and (6). This seat assembly 4 can translate via the threaded portion (3) to adjust the relative position of the seat (11) to a piston/pin (7). Between the seals (5) and (6) that are embodied in the moving seat is the outlet port (12) of the device. The piston/pin (7) is sealed from the atmosphere by a seal (9). The piston/pin (7) is biased by a spring (8).

Figure 2:
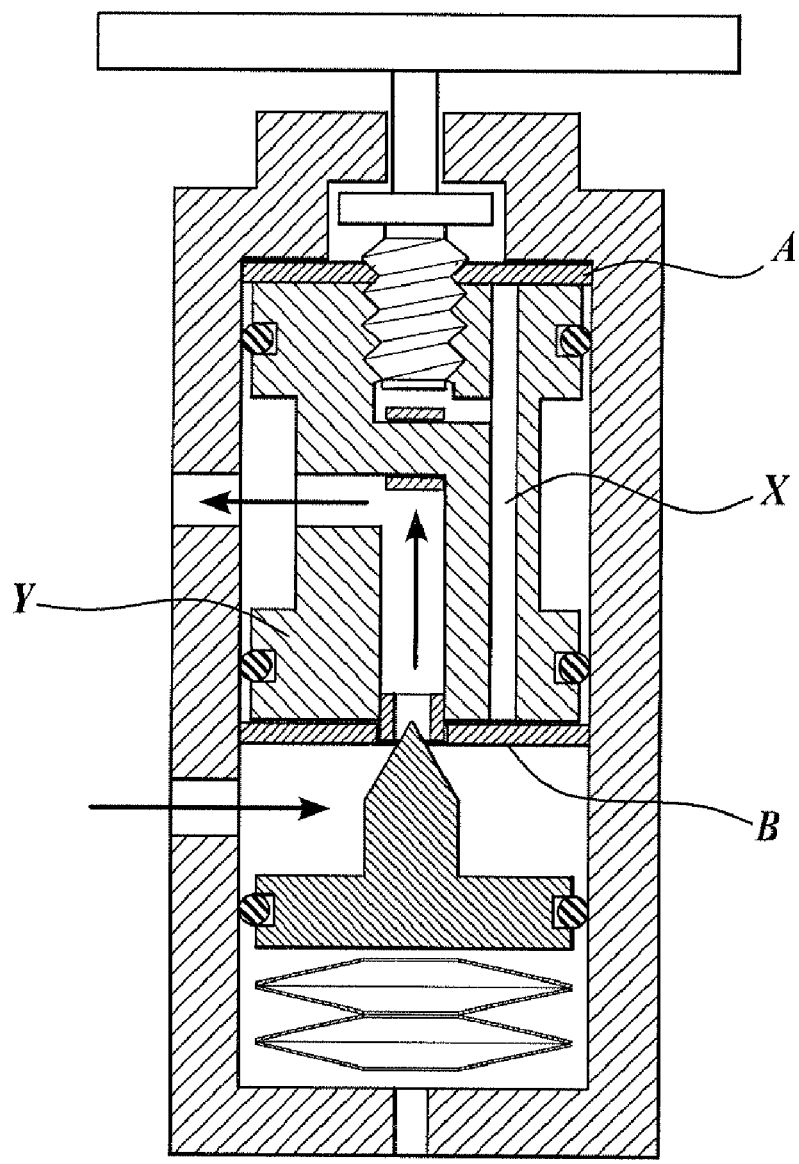
FIG. 2 is a cross-sectional side view of the pressure regulator of FIG. 1, showing a fluid flow path of fluid through the pressure regulator of FIG. 1.

When pressure is introduced via the inlet port (10), the piston/pin (7) is displaced against the bias of the spring (8). The position of the seat assembly (4) and seat (11) can be adjusted via the adjustment handle (2). This adjustment controls the size of the fluid passageway. Referring to FIG. 2, there is a passage (X) through the moving seat assembly (4) which allows fluid to be equally pressurized on either side of the moving seat assembly (4). Also note that the areas (A) and (B) are equivalent; thus, the seat is in balance in terms of static pressure.

Figure 3:
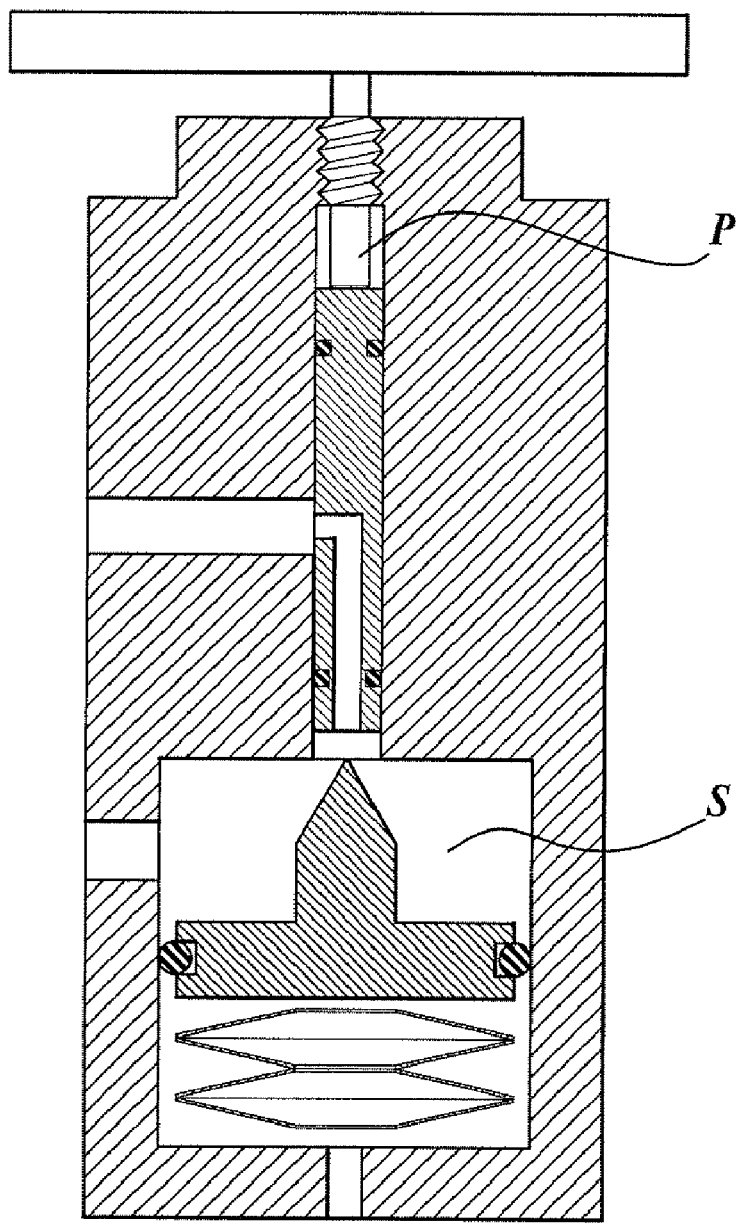
FIG. 3 is a cross-sectional view of a prior art pressure regulator.

Referring to FIG. 3, previous technology shows how the moving seat is not in balance, as one end is at atmospheric pressure (P), while the other is at system pressure (S). When the seat is moved forward, as is the case in previous technology, it must displace the volume at system pressure. This requires a much higher input force.

Referring to FIGS. 4-7, the body (1) is a pressure vessel which includes an inlet port (10) and an outlet port (12) and has a boring in which the moving parts can translate. FIG. 5A shows the flow path of fluid through the pressure regulator.

Figure 6:
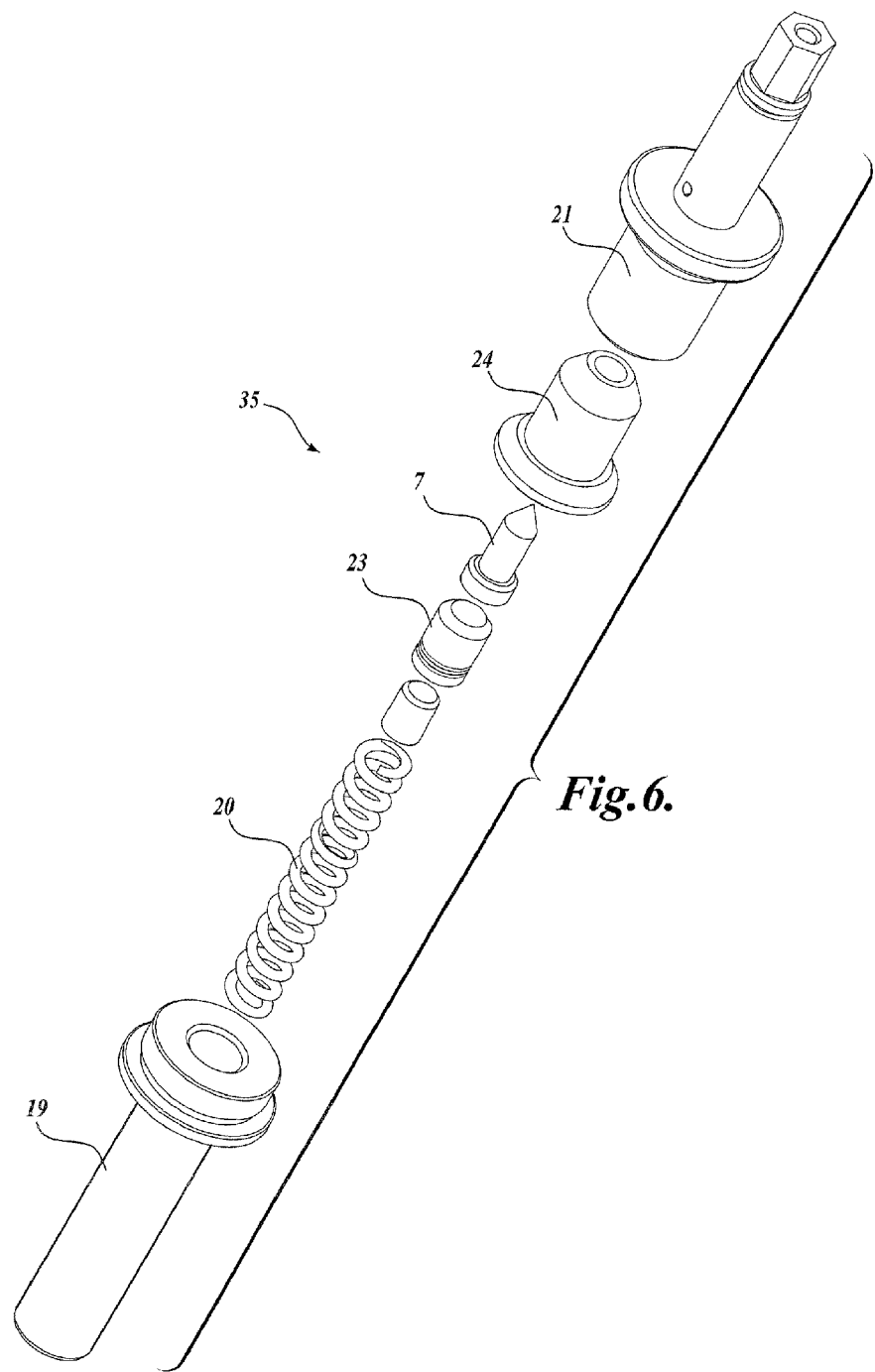
FIG. 6 is an isometric exploded view of a pin subassembly of the pressure regulator of FIG. 4.
Figure 7:
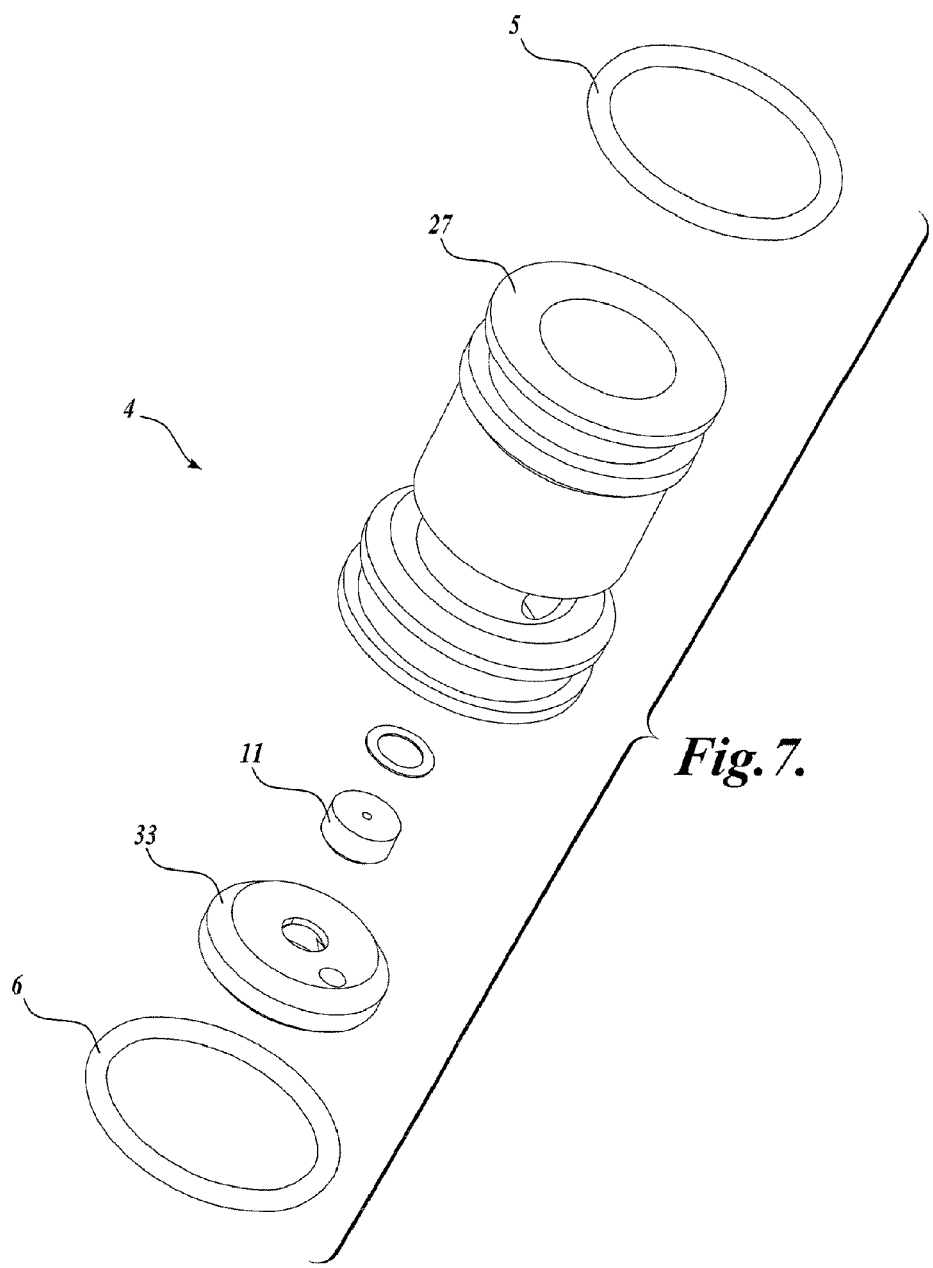
FIG. 7 is an isometric exploded view of a seat subassembly of the pressure regulator of FIG. 4.

Referring to FIGS. 6 and 7, there two sub assemblies within the body (1): A pin sub assembly (35) (FIG. 6) and a seat sub assembly (4) (FIG. 7). These two sub assemblies are made up of components which form an adjustable passageway. This passageway is of a pin (7) and seat (11) design in which the seat (11) has a fixed orifice, and the pin (7) is positioned at varying distances within that orifice to change the area of the passageway.

Figure 4:
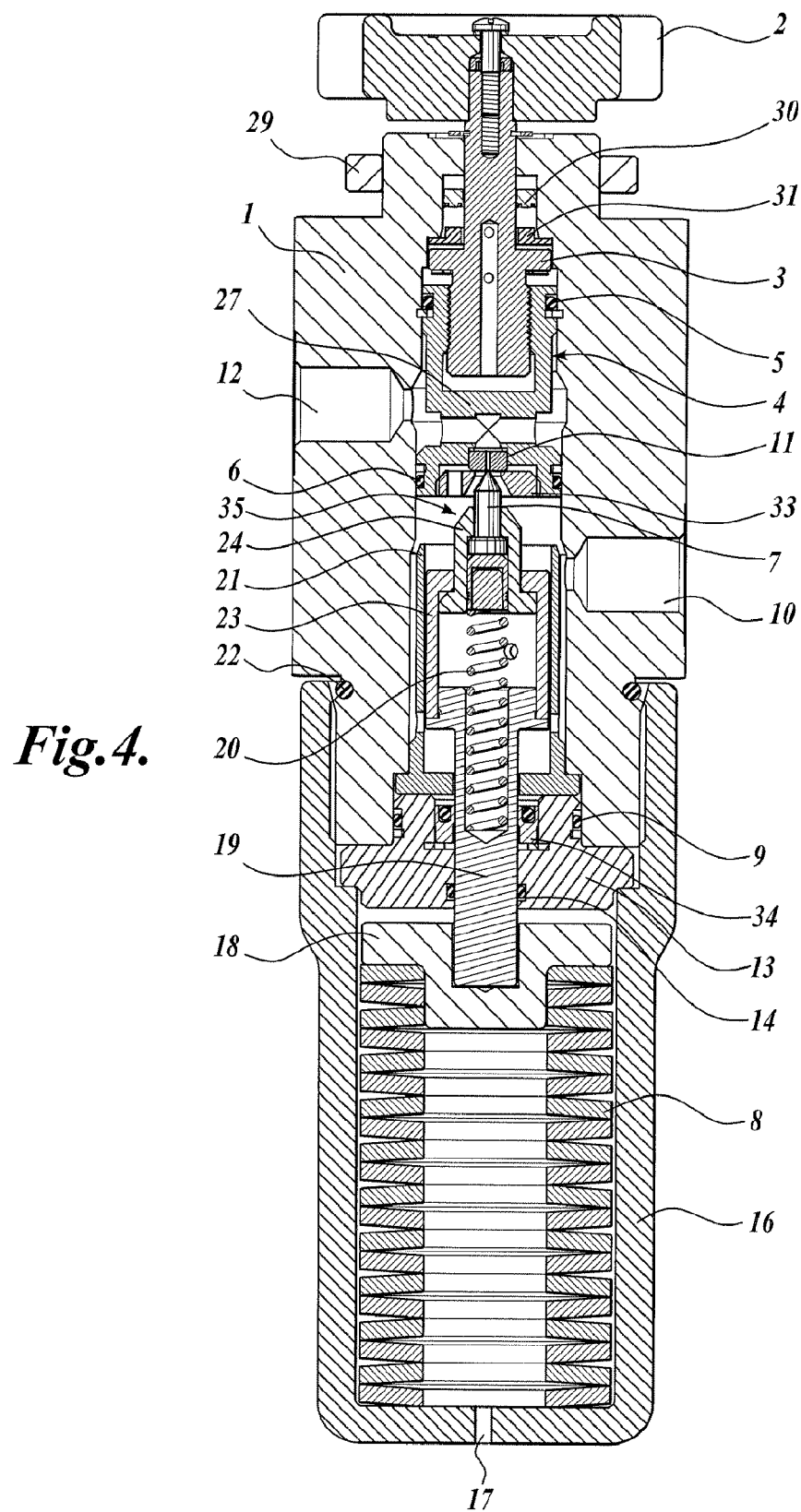
FIG. 4 is a cross-sectional side view of the pressure regulator of FIG. 1.

Referring to FIG. 4, the two sub assemblies can both translate relative to each other. The pin sub assembly (35) passes through a device called a cartridge (13) and is positioned by, a spring (8). The pin sub assembly (35) is free to translate through the cartridge (13). The cartridge (13) positions the pin sub assembly (35) within the body (1) in conjunction with a variety of seals (2), (9), (34), and (14). This forms a closure element to the atmosphere for the body 1.

At the point where the pin sub assembly (35) exits the cartridge (13), it is trapped by a receiver 18. This receiver (18) is biased against a spring stack (8) which is contained within the spring housing (16). The receiver 18 is free to translate within the spring housing (16). In turn, the spring housing (16) is threaded to the body (1) and captures the cartridge (13), locking it into place.

The pin sub assembly (35) is comprised of a slider (19), a spring (20), a slider cap (23), a pin housing (24), the pin (7) and a pin retainer (21).

The slider (19) and slider cap (23) are threaded together. The slider cap (23) holds the pin (7) and the pin housing (24) in position. The pin(7) and pin housing (24) are biased against the spring (20).

The pin (7) and pin housing (24) are free to translate within the space formed by the slider (19) and the slider cap (23).

The volume formed by the slider (19) and the slider cap (23) is not sealed from the internal pressure of the valve.

The purpose of this spring-biased sliding mechanism is to allow the spring stack (8) to fully extend when pressure is absent from the valve to prevent the pin (7) from being damaged.

Referring to FIG. 7, the seat sub assembly (4) consists of a seat holder (27), the seat (7) which embodies an orifice, a seat retainer (8), and a set of seals (5) and (25) that prevent fluid from flowing to the outlet port (12), thus ensuring that all the fluid passes through the orifice in the seat (7).

Referring to FIG. 4, the seat sub assembly (4) is engaged by a threaded stem (3), which is captured by the body (1) and is free to rotate within the body (1). This rotational motion allows the seat sub assembly (4) (FIG. 7) to translate within the body (1), thus changing the position relative to the pin (7) and thereby changing the size of the passageway. This allows a pressure set-point to be achieved.

Figure 5A:
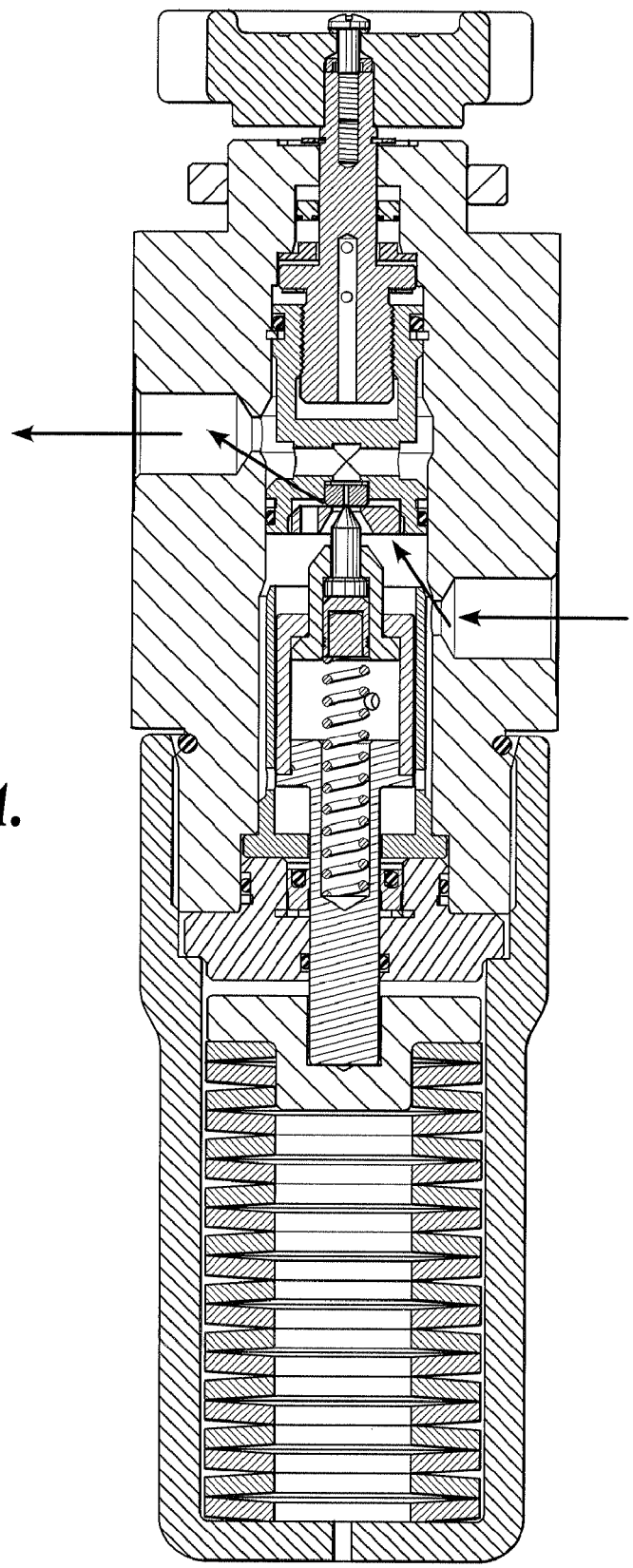
FIG. 5A is a cross-sectional side view of the pressure regulator of FIG. 4, showing the flow path of fluid through the pressure regulator.
Figure 5B:
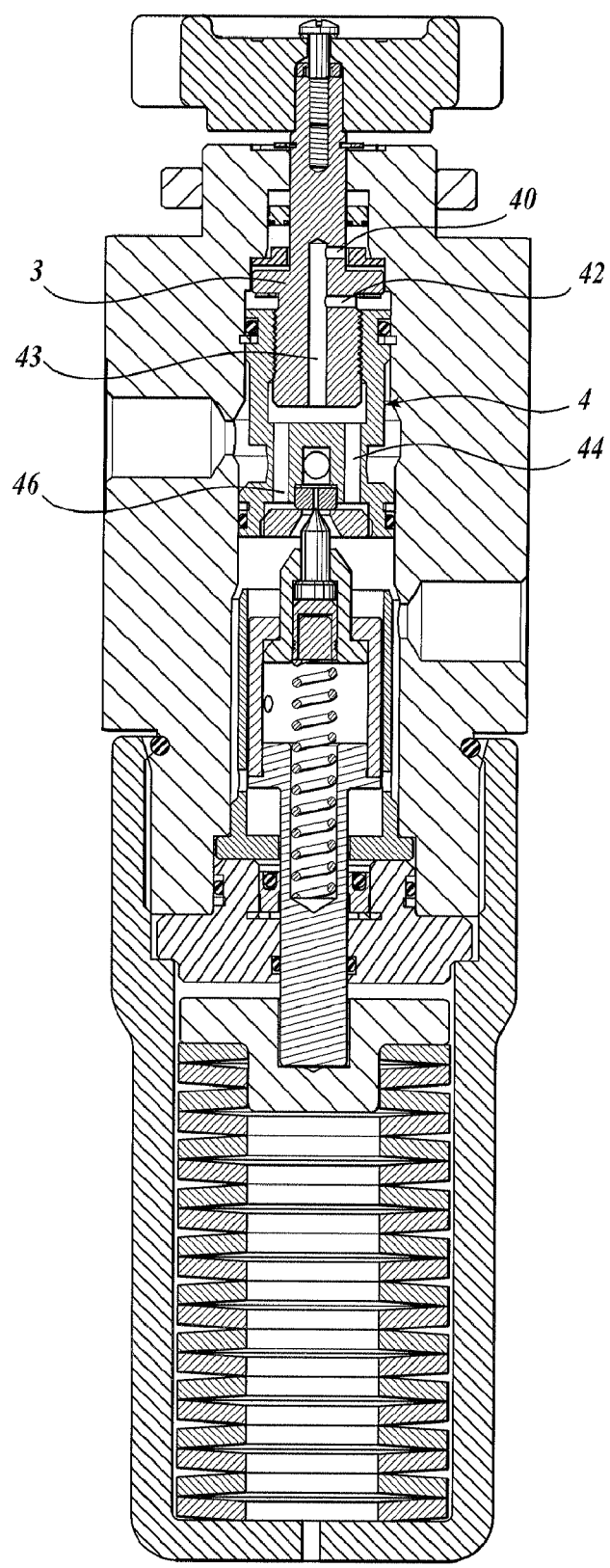
FIG. 5B is a cross-sectional side view of the pressure regulator of FIG. 4 rotated 90 degrees from the position illustrated in FIG. 4.

Referring to FIG. 5B, the threaded stem (3) is manifolded through a series of drilled passages 40, 42, and 43 to allow pressure equalization. This minimizes the torque requirement needed to move the seat sub assembly (4). The seat sub assembly (4) also is manifolded through a series of drillings 44 and 46. This allow fluid pressure to be equalized around the seat sub assembly (4). The drillings 40, 42, 43, 44 and 46 allow the seat sub assembly (4) to translate within the valve freely, as there is no change in volume when the seat sub assembly (4) (FIG. 7) is translated.

The internal pressure of the valve is maintained through a variety of seals (2), (9), (34), and (14).

Additionally, there is an adjustment handle (2) fixed to the threaded stem (3). The threaded stem (3) is pressure biased against a bearing (31) which allows the threaded stem (3) to rotate freely.

There is also a panel nut (29) which provides a means of mounting the valve to a control panel, an air vent (17) and a dust seal (22).

The embodiments of the invention in which an exclusive property or privilege is claimed are defined as follows:

1. An adjustable pressure control valve for controlling the flow of fluid from a fluid supply, comprising:
   (a) a valve body;
   (b) a handle rotatably received within the valve body;
   (c) a seat assembly disposed within the valve body, the seat assembly operably coupled to the handle such that the seat assembly is moveable in a first linear direction when the handle is rotated in a first direction and moveable in a second linear direction when the handle is rotated in a second direction;
   (d) a plurality of passages formed in the seat assembly that allow fluid to pass freely therethrough; and
   (e) a pin biased against an opening in the seat assembly for controlling the amount of fluid passing through the seat assembly.

2. The valve of claim 1, wherein the valve body includes an inlet port and an outlet port, the inlet port adapted to be placed into communication with a fluid supply to allow a volume of fluid to pass into the valve.

3. The valve of claim 1, wherein the plurality of passages allow the seat assembly to move within the valve body without substantially changing the volume of fluid within at least a portion of the valve.

4. The valve of claim 1, wherein a first amount of fluid passes through the seat assembly when the seat assembly is moved in the first linear direction, and a second amount of fluid passes through the seat assembly when the seat assembly is moved in the second linear direction.

5. The valve of claim 1, further comprising at least one spring engaging the pin, wherein the at least one spring balances the pin against the pressure of the fluid in the valve.

6. The valve of claim 1, wherein the handle includes a plurality of passages that allow fluid to pass freely therethrough such that the handle may be rotated in the first and second directions without substantially changing the volume of fluid within at least a portion of the valve.

7. An adjustable pressure control valve for controlling the flow of fluid from a fluid supply, comprising:
   (a) a valve body having an inlet port and an outlet port, the inlet port adapted to be placed into communication with a fluid supply to allow a volume of fluid to pass into the valve;
   (b) a handle rotatably received within the valve body;
   (c) a seat assembly disposed within the valve body and in fluid communication with the inlet port and the outlet port, the seat assembly operably coupled to the handle such that the seat assembly is moveable in a first direction when the handle is rotated in a first rotation direction and moveable in a second direction when the handle is rotated in a second rotation direction;
   (d) a plurality of passages formed in the seat assembly that allow fluid to pass therethrough such that the seat assembly is moveable within the valve body without substantially changing the volume of fluid within at least a portion of the valve; and
   (e) a pin biased against an opening in the seat assembly for controlling the amount of fluid passing through the seat assembly, wherein a first amount of fluid passes through the seat assembly when the seat assembly is moved in the first direction, and a second amount of fluid passes through the seat assembly when the seat assembly is moved in the second direction.

8. The valve of claim 7, wherein the handle includes a threaded portion disposed within the body and an adjustment knob positioned outside the body.

9. The valve of claim 8, wherein a portion of the seat assembly is threadably received on the threaded portion of the handle.

10. The valve of claim 7, further comprising at least one spring that engages the pin, wherein the at least one spring balances the pin against the pressure of the fluid in the valve.

11. The valve of claim 7, further comprising a plurality of seals disposed between the seat assembly and the valve body for isolating the outlet port from any fluid flow other than through the seat assembly.

12. The valve of claim 11, wherein the seat assembly is translatable within the valve body over a pre-determined range defined by the plurality of seals.

13. The valve of claim 7, wherein the handle includes a plurality of passages that allow fluid to pass freely therethrough such that the handle may be rotated in the first and second rotation directions without substantially changing the volume of fluid within at least a portion of the valve.

14. An adjustable pressure control valve for controlling fluid from a fluid supply, comprising:
   (a) a body having an inlet port and an outlet port, the inlet port adapted to be placed into communication with a fluid supply;
   (b) a handle having a threaded portion disposed within the body and an adjustment knob positioned outside the body;
   (c) a seat assembly disposed within the body, the seat assembly comprising:
      (i) a seat holder in fluid communication with the outlet port, the seat holder having first and second ends, the first end of the seat holder threadably received on the threaded portion of the handle, wherein the seat holder is moveable in a first direction when the handle is rotated in a first rotation direction and moveable in a second direction when the handle is rotated in a second rotation direction, wherein the seat holder allows a predetermined amount of fluid to pass therethrough when the seat holder is translated in the first and second directions; and
      (ii) a valve seat affixed to the second end of the seat holder;
   (d) a pin assembly at least partially disposed within the body, the pin assembly having a pin biased by a pin spring such that the pin is engageable with an opening in the valve seat; and
   (e) a valve spring assembly having a spring housing coupled to the body and a main spring disposed within the spring housing, the main spring engageable with the pin assembly to urge the pin against the valve seat to accommodate the pressure and volume of fluid in the valve.

15. The valve of claim 14, wherein the valve seat engages the pin assembly when the seat holder is moved in the first direction such that fluid is substantially prevented from passing through the seat holder, and wherein the valve seat is separable from the pin assembly when the seat holder is moved in the second direction such that fluid can pass through the seat holder.

16. The valve of claim 14, wherein the pin spring balances the pin assembly against the pressure of the fluid in the valve.

17. The valve of claim 14, further comprising a plurality of seals disposed between the seat holder and the body for isolating the outlet port from any fluid flow other than through the seat holder.

18. The valve of claim 17, wherein the seat holder is translatable within the body over a pre-determined range defined by the plurality of seals.

19. The valve of claim 14, wherein the seat holder includes a plurality of passages that allow fluid to pass freely therethrough such that the seat holder is moveable within the body without substantially changing the volume of fluid within at least a portion of the valve.

20. The valve of claim 14, wherein the handle includes a plurality of passages that allow fluid to pass freely therethrough such that the handle may be rotated in the first and second rotation directions without substantially changing the volume of fluid within at least a portion of the valve.

* * * * *